United States Patent
Higgins et al.

(10) Patent No.: US 11,456,979 B2
(45) Date of Patent: Sep. 27, 2022

(54) AUTOMATED NATURAL LANGUAGE COMMUNICATION ANALYSIS

(71) Applicant: Accenture Global Solutions Limited, Dublin (IE)

(72) Inventors: Luke Higgins, West Pymble (AU); Aditi Kulkarni, Bengaluru (IN); Koushik M. Vijayaraghavan, Chennai (IN); Alastair Donnelley, Darlington (AU); Rajendra Prasad Tanniru, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 258 days.

(21) Appl. No.: 16/519,841

(22) Filed: Jul. 23, 2019

(65) Prior Publication Data
US 2021/0029064 A1    Jan. 28, 2021

(51) Int. Cl.
| | |
|---|---|
| *G06F 15/16* | (2006.01) |
| *H04L 51/046* | (2022.01) |
| *G06N 20/00* | (2019.01) |
| *G06Q 30/02* | (2012.01) |
| *H04L 51/42* | (2022.01) |

(52) U.S. Cl.
CPC .......... *H04L 51/046* (2013.01); *G06N 20/00* (2019.01); *G06Q 30/0203* (2013.01); *H04L 51/42* (2022.05)

(58) Field of Classification Search
CPC ......... H04L 51/02; H04L 51/04; H04L 51/18; H04L 51/20; H04L 51/046; H04L 67/02; H04L 67/16; H04L 67/42; H04L 67/322; H04L 69/14

USPC .............. 709/204–206, 224–225, 228–229, 709/203–206, 217, 220
See application file for complete search history.

(56) References Cited

U.S. PATENT DOCUMENTS

| | | | |
|---|---|---|---|
| 10,042,636 B1 | 8/2018 | Srivastava et al. | |
| 2018/0349844 A1 | 12/2018 | Moustafa et al. | |
| 2019/0138648 A1* | 5/2019 | Gupta | ................ G06F 16/3329 |
| 2019/0182382 A1* | 6/2019 | Mazza | .................... G10L 15/26 |
| 2019/0377619 A1* | 12/2019 | Riva | ..................... G06N 5/022 |

(Continued)

FOREIGN PATENT DOCUMENTS

| | | |
|---|---|---|
| WO | 2018071594 A1 | 4/2018 |
| WO | 2018209254 A1 | 11/2018 |

OTHER PUBLICATIONS

Extended European Search Report for Application No. EP20187384.1, dated Jan. 13, 2021, 8 pages.

*Primary Examiner* — Farzana B Huq
(74) *Attorney, Agent, or Firm* — Harrity & Harrity, LLP

(57) ABSTRACT

A device may receive information identifying a communication framework for a mass communication task. The device may determine a success score for the communication framework using a mass communication model, wherein the success score represents a likelihood of a successful response in connection with using the communication framework for the mass communication task. The device may generate a recommendation for the communication framework based on the success score and using the mass communication model. The device may alter the communication framework to implement the recommendation and generate a modified communication framework. The device may perform the mass communication task using the modified communication framework.

20 Claims, 9 Drawing Sheets

(56) References Cited

U.S. PATENT DOCUMENTS

2020/0244605 A1\* 7/2020 Nagaraja ................. H04L 67/16
2020/0251111 A1\* 8/2020 Temkin ............... G06F 16/2423

\* cited by examiner

| Message Structure/Content AI Module 280-1 | Dynamic Automated Message/ Content Construction Module 280-2 | Response Analytics Module 280-3 |
| --- | --- | --- |
| Machine Learning Module (Clustering/Segmentation/Pattern Matching/Prediction/Anomaly Detection) 280-4 | Messaging Scheduling/Channel Selection Optimization Module 280-5 | Recipient Targeting Automation Module 280-6 |
| Automated Message Dispatch Module 280-7 | Automated Response Collection Module 280-8 | Response Matching/Conversation Completion Detection Module 280-9 |

AUTOMATED NATURAL LANGUAGE COMMUNICATION ANALYSIS

BACKGROUND

A central messaging device may transmit messages to message recipients via a communication channel of a network and may receive responses from the message recipients via the communication channel. For example, an email server may transmit emails to email recipients and may receive responses to the emails. Similarly, an instant messaging system may use an instant messaging communication channel for real-time text transmission and reception over a network (e.g., a local area network, the Internet, and/or the like). In some cases, more complex messaging may be performed using a communication channel. For example, a chatbot may be deployed to enable natural language messaging. Chatbots may be deployed to provide instructions, to obtain survey information, and/or the like in an automated manner.

SUMMARY

According to some implementations, a method may include receiving, by a device, information identifying a communication framework for a mass communication task; determining, by the device, a success score for the communication framework using a mass communication model, wherein the success score represents a likelihood of a successful response in connection with using the communication framework for the mass communication task; generating, by the device, a recommendation for the communication framework based on the success score and using the mass communication model; altering, by the device, the communication framework to implement the recommendation and generate a modified communication framework; and performing, by the device, the mass communication task using the modified communication framework.

According to some implementations, a device may include one or more memories, and one or more processors, communicatively coupled to the one or more memories, configured to: receive a mass communication data set identifying results of a set of mass communication tasks performed using a set of communication frameworks; generate, using a machine learning technique and based on the mass communication data set, a mass communication model; store the mass communication model for subsequent use in evaluating a communication framework for a mass communication task; receive, after storing the mass communication model, information identifying the communication framework for the mass communication task; determine a success score for the communication framework using the mass communication model, wherein the success score represents a likelihood of a successful response in connection with using the communication framework for the mass communication task; generate a recommendation for the communication framework based on the success score and using the mass communication model; alter the communication framework to implement the recommendation and generate a modified communication framework; and perform the mass communication task using the modified communication framework.

According to some implementations, a non-transitory computer-readable medium may store one or more instructions. The one or more instructions, when executed by one or more processors of a device, may cause the one or more processors to: receive information identifying a communication framework for a mass communication task; determine a success score for the communication framework using a mass communication model, wherein the success score represents a likelihood of a successful response in connection with using the communication framework for the mass communication task; generate a recommendation for the communication framework based on the success score and using the mass communication model, wherein the recommendation relates to message recipient-level differentiation such that a first message recipient is associated with a different time slot, messaging channel, or message content relative to a second message recipient; alter the communication framework to implement the recommendation and generate a modified communication framework; and perform the mass communication task using the modified communication framework.

BRIEF DESCRIPTION OF THE DRAWINGS

FIGS. 2A and 2B are diagrams of an example environment in which systems and/or methods described herein may be implemented.

DETAILED DESCRIPTION

Figure 1A:
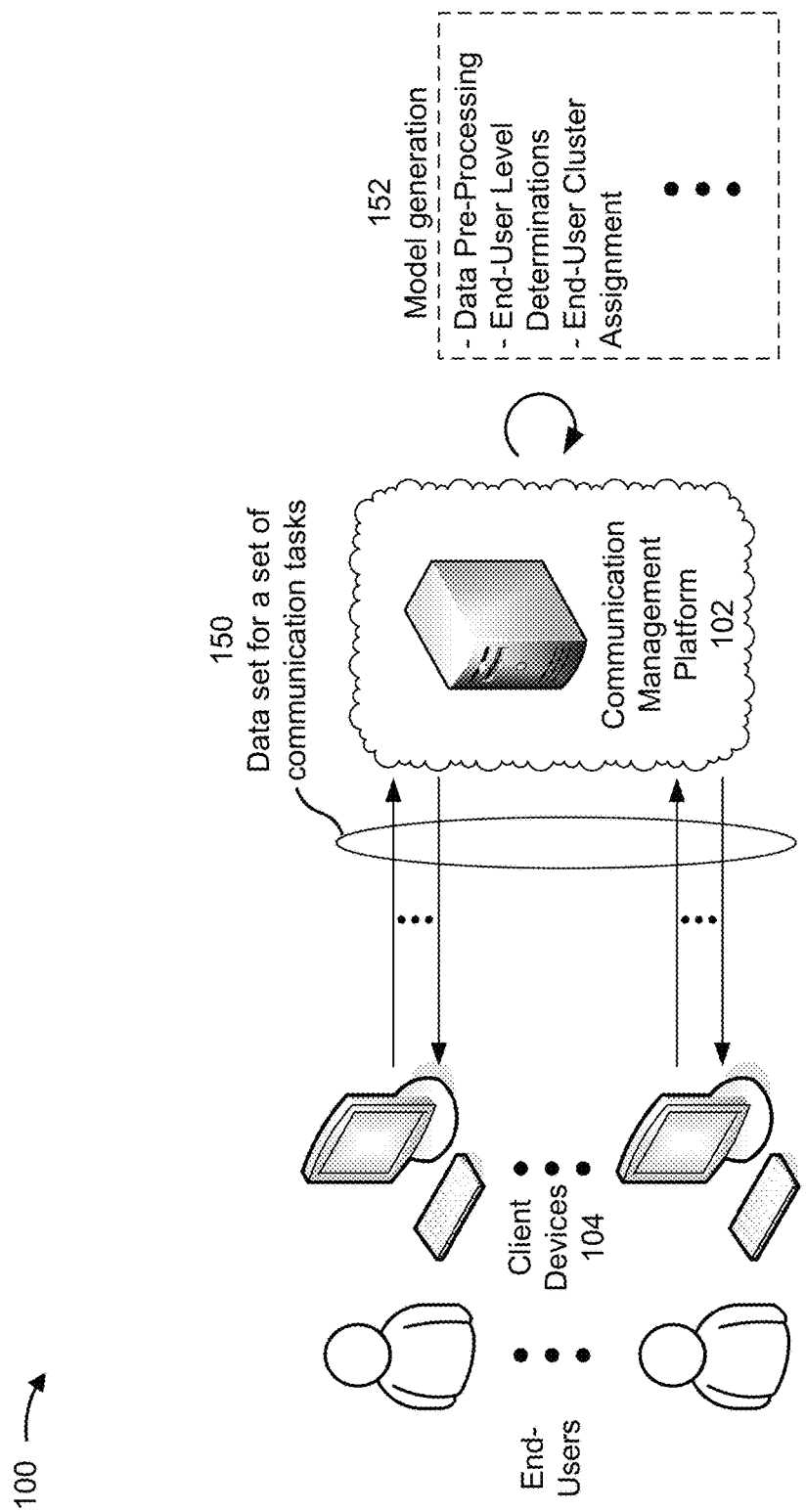
FIGS. 1A-1C are diagrams of example implementations described herein.

The following detailed description of example implementations refers to the accompanying drawings. The same reference numbers in different drawings may identify the same or similar elements.

Mass communication tasks may include surveying tasks, customer service tasks, customer contact tasks, and/or the like. Manual performance of mass communication tasks may require hundreds or thousands of people using hundreds or thousands of computers to communicate with message recipients for the mass communication task. Some mass communication tasks may be automated through use of, for example, a chatbot application, which may reduce a utilization of computing resources by reducing a quantity of computers that are deployed, increasing an accuracy of messaging (e.g., thereby reducing a quantity of follow up messages to correct inaccurate messages), and/or the like.

A chatbot application may automatically transmit notifications, transmit requests for information, receive responses, provide information, and/or the like using a communication channel, such as an instant messaging channel, an email messaging channel, a short message service (SMS) messaging channel, and/or the like. During mass communication tasks, a chatbot application may be configured to provide messaging to and/or receive messaging from thousands, tens of thousands, or even millions of message recipients (e.g., users of the chatbot application). Such messaging may be defined by a user, who may specify recipients of the messaging, when the messaging is to occur, what a content of the messaging is to be, and/or the like.

However, some message recipients may not respond to messaging, which may result in a user triggering follow-up messaging (e.g., to remind a message recipient to respond). Similarly, sometimes messaging may be unclear to a message recipient (e.g., instructions may be confusing or complex), which may result in significant back and forth messaging between the message recipient and the chatbot. As a result, automation of mass communication tasks using, for example, a chatbot application, may still result in excess use of network resources to transmit messaging, excess use of computing resources to generate messaging, and/or the like.

Some implementations described herein provide automated natural language communication analysis (e.g., using a communication management platform). In this case, the communication management platform may analyze a communication framework for a mass communication task (e.g., a timing of messaging, a communication channel used for messaging, a content of messaging, and/or the like), alter the communication framework to improve the communication framework, and complete the mass communication task using the improved communication framework. In this case, improving the communication framework may include altering, based on a machine learning based mass communication model, characteristics of the communication framework, such as a length of messaging, a relevance of messaging, a complexity of messaging, a clarity of messaging, a scheduling of messaging, a set of recipients for messaging, and/or the like.

Moreover, the mass communication management platform may alter the communication framework at an end-user level based on information regarding end-users (e.g., message recipients) to customize messaging to the message recipients (e.g., by providing messaging at a time and via a communication channel determined to be most likely to result in a response from the message recipient). In this way, the mass communication management platform increases a likelihood of success of the mass communication task, reduces messaging required to complete the mass communication task, reduces network resource utilization to perform messaging of the mass communication task, reduces processing utilization to generate messaging for the mass communication task, and/or the like.

Figure 1B:
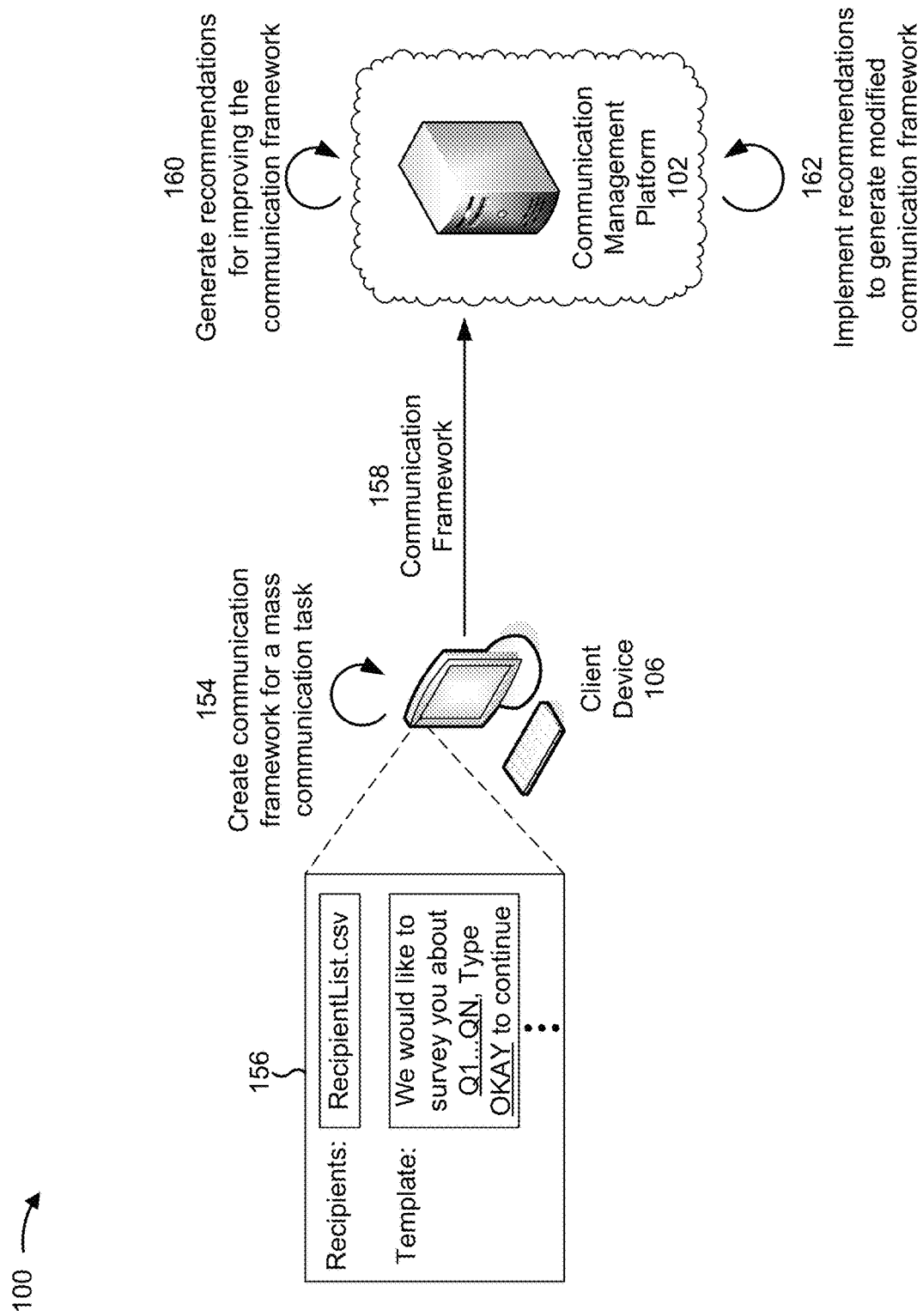
Figure 1C:
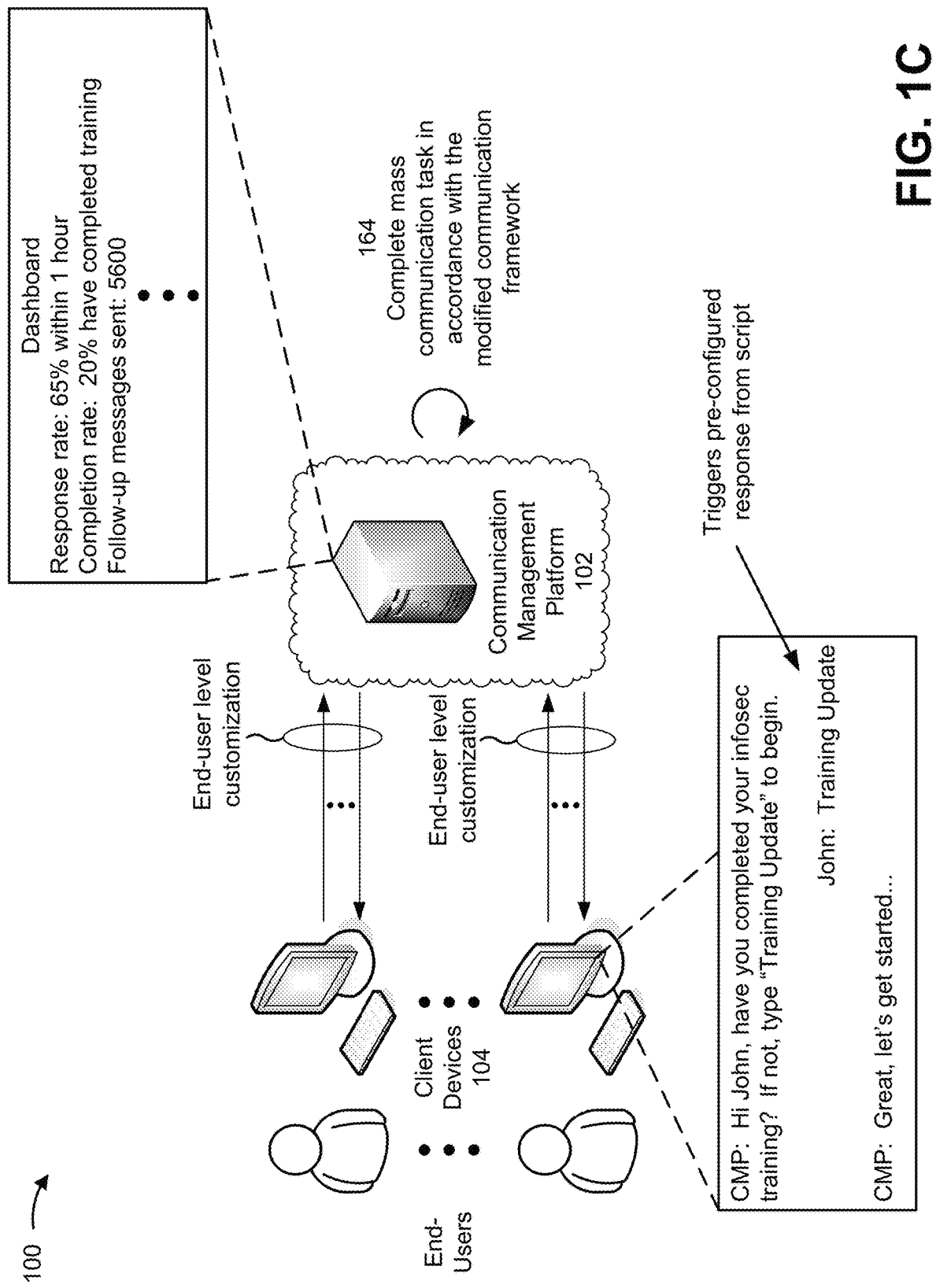

FIGS. 1A-1C are diagrams of an example implementation 100 described herein. As shown in FIG. 1A, example implementation 100 includes a communication management platform 102 and a set of client devices 104 (e.g., being used by a set of end-users, who may be message recipients for a set of mass communication tasks).

As further shown in FIG. 1A, and by reference number 150, communication management platform 102 may obtain a data set for a set of mass communication tasks. For example, communication management platform 102 may complete a set of mass communication tasks and may monitor one or more parameters relating to the set of mass communication tasks to generate the data set. A mass communication task may include a task for which thousands, millions, or even billions of messages are sent. For example, a mass communication task may include checking a status of completion of a security audit, polling employees about respective workloads, performing a product experience survey, checking compliance with a training program, confirming resource status with a group of end-users, updating ticket-raisers with ticket statuses, providing feedback on resource productivity, and/or the like.

In some implementations, communication management platform 102 may receive information identifying the data set based on one or more other devices performing the set of mass communication tasks using automated techniques (e.g., chatbot applications), manual techniques (e.g., human surveying, call centers, and/or the like), and/or the like. In some implementations, communication management platform 102 may store chat logs for messages of a mass communication task (e.g., identifying a content of a set of messages, a timing of a set of messages, and/or the like), and may use the chat logs as a part of the data set. In this case, communication management platform 102 may periodically query a chat log storage data structure (e.g., of communication management platform 102, of a chat platform, and/or the like) to obtain the chat logs.

In some implementations, communication management platform 102 may obtain classification data regarding end-users (e.g., message recipients and/or potential message recipients). For example, communication management platform 102 may obtain information identifying a message recipient location, a message recipient job role, a message recipient job level, message recipient working hours, a message recipient response history, and/or the like.

As further shown in FIG. 1A, and by reference number 152, communication management platform 102 may perform one or more model generation procedures associated with generating a mass communication model of mass communication task completion. For example, communication management platform 102 may perform a data pre-processing procedure, an end-user level determination procedure, an end-user cluster assignment procedure, and/or the like.

In some implementations, communication management platform 102 may pre-process the data to enable model generation. For example, communication management platform 102 may pre-process time stamps associated with messages of mass communication tasks to assign messages to time slots (e.g., in which subsequent messages can be transmitted and/or received). Additionally, or alternatively, communication management platform 102 may pre-process the time stamps to determine delays between message transmission and message response reception, to remove outlier data points that may skew data analysis, and/or the like. In some implementations, communication management platform 102 may perform a feature reduction or feature selection procedure. For example, during data pre-processing, communication management platform 102 may select a subset of available metrics to use for model generation, thereby reducing an amount of processing resources associated with model generation.

In some implementations, communication management platform 102 may perform a data set separation procedure to enable model generation. For example, communication management platform 102 may divide the data set into a training set for training machine learning for model generation, a testing set for testing a machine learning model, a validation set for validating an accuracy of a machine learning model, and/or the like. In some implementations, communication management platform 102 may use a particular type of model generation technique when parsing the data set and/or sub-parts thereof to generate a mass communication model. For example, communication management platform 102 may use a random forest classifier technique, a multilayer perceptron technique, a stochastic gradient descent technique, a neural network technique, and/or the like.

In some implementations, the mass communication model may be a particular type of model. For example, communication management platform 102 may generate a rules-based model, a machine-learning model, a hybrid rules-based/machine-learning model, and/or the like. In some implementations, the mass communication model may be a model for analyzing a communication framework. For example, communication management platform 102 may generate a model for analyzing a script relative to historical scripts, for predicting a response rate to messages, for generating recommendations to improve the response rate for messages, and/or the like based on past scripts, past response rates, past characteristics of communication frameworks, and/or the like.

In some implementations, communication management platform 102 may store the mass communication model for subsequent use. For example, communication management platform 102 may store the mass communication model in a data structure for utilization in analyzing a subsequent communication framework for a subsequent mass communication task. In some implementations, communication management platform 102 may dynamically update the mass communication model. For example, communication management platform 102 may monitor completion of mass communication tasks and may periodically use data regarding completion of the mass communication tasks to update end-user level determinations, end-user cluster assignments, possible recommendations for altering a communication framework, and/or the like, as described in more detail herein.

In some implementations, communication management platform 102 may define a set of end-user level determinations in connection with the mass communication model. For example, communication management platform 102 may determine a set of possible time slots that can be assigned to message recipients, a set of possible communication channels that can be assigned to message recipients, and/or the like. In this case, communication management platform 102 may use the mass communication model to predict an effect of assigning users to different time slots, communication channels, and/or the like. In some implementations, communication management platform 102 may define a set of end-user clusters. For example, communication management platform 102 may assign a set of previous message recipients (e.g., some of whom may be message recipients for a subsequent mass communication task) to a particular end-user cluster using a cluster analysis technique. In some implementations, communication management platform 102 may assign a message recipient to an end-user cluster based on message data regarding the message recipient, employment data regarding the message recipient (e.g., a job role, a job level, a job location, and/or the like), demographic data regarding the message recipient, and/or the like. In this case, the end-user cluster may be assigned similar end-user level customizations. For example, a particular message recipient may be assigned (e.g., using a K-prototypes algorithm for categorical and/or numerical data based clustering) to a cluster of users for whom messages are to be sent at a similar time, using a similar communication channel, using a similar language, and/or the like. In this way, when the mass communication model is subsequently used to analyze a communication framework, communication management platform 102 may apply end-user level customizations to message recipients of the communication framework based on an existing end-user cluster assignment, based on a subsequently performed end-user cluster assignment, and/or the like.

As further shown in FIG. 1B, and by reference numbers 154 and 156, a client device 106 (e.g., based on instructions from communication management platform 102) may create a communication framework for a mass communication task. For example, client device 106 (e.g., in connection with instructions from communication management platform 102) may provide a user interface with which to receive a set of user selections of a set of parameters for a mass communication task. In this case, user selections may include a set of commands or code provided to define a script, information identifying a set of resources (e.g., a resource identifying a set of message recipients, a resource identifying a message content, and/or the like), and/or the like.

In some implementations, communication management platform 102 may provide one or more communication framework recommendations for completing the communication framework. For example, communication management platform 102 may receive information identifying a first part (e.g., one or more first parameters) of a communication framework, may identify a similar communication framework that is similar to the first part of the communication framework, and may suggest a second part for the communication framework based on the similar communication framework. In this case, communication management platform 102 may generate similarity scores for the first part of the communication framework relative to other communication frameworks (e.g., using the mass communication model and based on a content of messages, an identity of recipients, a timing of messaging, and/or the like) and may select another communication framework with a highest similarity score. In some implementations, the communication framework, the script thereof, information identifying the set of resources, and/or the like may be reusable and/or customizable for multiple mass communication tasks, thereby reducing resources relative to a user creating a new communication framework for each mass communication task.

In some implementations, the set of message recipients may be statically defined for communication management platform 102. For example, communication management platform 102 may receive information statically identifying the set of message recipients for the mass communication task. Additionally, or alternatively, communication management platform 102 may receive information, such as a query, to enable communication management platform 102 to dynamically determine message recipients during performance of the mass communication task (e.g., to update and/or change the set of message recipients during performance of the mass communication task). Additionally, or alternatively, communication management platform 102 may determine message recipients based at least in part on analysis of patterns or data trends using, for example, a machine learning model.

In some implementations, communication management platform 102 may enable creation of a script for the mass communication task and may generate the mass communication framework based on the script. For example, communication management platform 102 may provide a user interface with which to receive artificial intelligence scripting language code (e.g., Rivescript), and may generate conversational flows, message templates, scheduling parameters, and/or the like for the mass communication task (e.g., for personalization at run-time of the mass communication task).

In some implementations, communication management platform 102 may compare a content and/or structure of the script and provide recommendations based on previous scripts, automatically define message recipient lists, automatically select time slots and/or communication channels for messaging, and/or the like. In this case, communication management platform 102 may use artificial intelligence, pattern matching techniques, and/or the like (e.g., communication management platform 102 may generate similarity scores, as described above) to match the script with other historical scripts, thereby enabling communication management platform 102 to provide suggestions for the script (e.g., based on the historical scripts) in real-time. In this way, based on generating a script for automating the mass communication task and automatically performing the mass communication task, communication management platform 102 reduces a likelihood of errors in performing the mass communication task relative to manual performance and data collection.

In some implementations, communication management platform 102 may use natural language processing to predefine a conversation flow. For example, communication management platform 102 may generate a set of automatic responses to a set of possible responses to a set of messages and may store the set of automatic responses. In this case, when communication management platform 102 receives a user response to a message, communication management platform 102 may use a stored automatic response to respond to the user response, thereby reducing processing utilization relative to generating an automatic response in real-time.

In some implementations, communication management platform 102 may determine to monitor for a particular type of response. For example, based on a script, communication management platform 102 may monitor messages from a message recipient for a particular key phrase, which communication management platform 102 may interpret as a successful response to the mass communication task. In this case, communication management platform 102 may store information relating to messages with the message recipient, may automatically import the key phrase into a data structure for data analysis, and/or the like. In some implementations, after detecting the particular type of response, communication management platform 102 may end the mass communication task for a particular message recipient. For example, communication management platform 102 may remove the particular message recipient from a mailing list. In some implementations, communication management platform 102 may communicate with a chat platform (e.g., an integrated chat platform or a chat platform external to communication management platform 102) to provide a script for the mass communication task, monitor chat logs, and/or the like. In some implementations, communication management platform 102 may interpret multiple portions of a chat. For example, communication management platform 102 may analyze the chat to determine whether a conversation is satisfactorily completed (e.g., whether requested information was obtained, whether a sentiment analysis indicates that the conversation was not acrimonious, and/or the like).

As further shown in FIG. 1B, and by reference number 158, based on creation of the communication framework for the mass communication task, communication management platform 102 may receive information identifying the mass communication framework. For example, communication management platform 102 may receive indications of one or more parameters for completing the mass communication task.

As further shown in FIG. 1B, and by reference numbers 160 and 162, communication management platform 102 may generate recommendations for improving the communication framework and may implement the recommendations to generate a modified communication framework. For example, communication management platform 102 may generate recommendations for end-user level customization, parameter changes, and/or the like to increase a likelihood of success of the mass communication task, reducing an amount of messaging predicted to be performed to complete the mass communication task, and/or the like.

In some implementations, communication management platform 102 may determine a success score for the communication framework using the mass communication model. For example, communication management platform 102 may analyze the communication framework to determine a likelihood of achieving a response to a particular message, a likelihood of achieving a threshold rate of response to a set of messages, and/or the like based on the mass communication model (e.g., based on past response rates for other mass communication tasks).

In some implementations, communication management platform 102 may generate a recommendation based on the success score. For example, communication management platform 102 may determine that a likelihood of successfully receiving a response from a particular end-user is less than a threshold and may generate a recommendation to alter a characteristic of a communication with the particular end-user to increase the likelihood of receiving the response. In this case, communication management platform 102 may determine to alter a time, a messaging channel, and/or the like for the particular end-user based on characteristics of one or more past mass communication tasks.

In some implementations, communication management platform 102 may generate a recommendation for modifying a particular parameter of the communication framework. For example, communication management platform 102 may generate a recommendation relating to a length of an initial message that is to be transmitted to a user. As an example, based on data indicating that a particular user is more likely to respond to a message with fewer than a threshold quantity of words (or greater than a threshold quantity of words), communication management platform 102 may automatically generate a different phrasing for a message to satisfy the threshold quantity.

Additionally, or alternatively, communication management platform 102 may generate a recommendation for modifying a relevance of the initial message of the communication framework. For example, communication management platform 102 may use natural language processing to determine a semantic relevance of the initial message to a type of response that is to be triggered by the initial message (e.g., whether a requested action is relatively clear to a reader), and may provide a suggestion for changing a wording, a grammatical structure, and/or the like. Additionally, or alternatively, communication management platform 102 may generate a recommendation for modifying a clarity or complexity of messaging of the communication framework. For example, communication management platform 102 may determine a decision tree based on a natural language processing analysis of a message. In this case, if the decision tree is associated with a threshold level of complexity based on a complexity metric (e.g., a depth metric, a breadth metric, and/or the like), communication management platform 102 may provide a recommendation for consolidating the decision tree.

Additionally, or alternatively, communication management platform 102 may generate a recommendation for modifying a scheduling of messaging of the communication framework. For example, communication management platform 102 may determine (e.g., based on assigning a first recipient to a particular cluster, as described above) that the first recipient is more likely to respond to a message at a first time of day and a second recipient (e.g., assigned to a different cluster) is more likely to respond to the message at a second time of day. In this case, communication management platform 102 may schedule messaging for each recipient to optimize a likelihood of response. In some implementations, communication management platform 102 may assign a recipient to a cluster even when the recipient has yet to receive any communications. For example, communication management platform 102 may use available data regarding the recipient (e.g., name, address, demographics, employment, etc.) to determine a similarity with other recipients, and assign the recipient to a cluster with other recipients. In some implementations, communication management platform 102 may perform an optimization procedure based on a limit to a quantity of messages that may be transmitted (or other resources that may be used) in any time slot to maximize a likelihood of response for each message. For example, communication management platform 102 may assign messages to different time slots based on both a message recipient likelihood of response and an availability of resources in each time slot. In this way, communication management platform 102 may transmit messages to message recipients during the selected time slots without exceeding a threshold resource utilization (e.g., a threshold network resource utilization, a threshold processing resource utilization, and/or the like).

As an example of optimal time slot determination for a particular message recipient, communication management platform 102 may determine, for each possible time slot, a ratio of responses received to messages sent in other mass communication tasks that included the particular message recipient. In some implementations, communication management platform 102 may weight the ratio based on responses received outside the time slot and in which no messages were set (e.g., such responses may receive a higher weighting than responses received in time slots where messages are sent, as such responses indicate that the particular message recipient may have been actively communicating in such a time slot without being triggered by actively receiving a message). Based on the ratios, communication management platform 102 may select a particular time slot with a highest ratio indicating a highest likelihood that the particular message recipient will respond to a subsequent message in the particular time slot.

A similar ratio determination procedure may be used for communication channels (e.g., ratios for instant messaging, emailing, short message service (SMS) messaging, and/or the like). In some implementations, a time slot may be assigned on a per-cluster basis to a cluster of message recipients that includes the particular message recipients. For example, based on assigning the message recipient to a cluster (e.g., based on a similar job, role, message response history, and/or the like, as described above), the cluster may be assigned to a time slot (or an ordered set of time slots) based on aggregate ratios for message recipients of the cluster. In this case, based on a failure to receive a response from the particular user in a first time slot of the ordered set of time slots, communication management platform 102 may determine to transmit a follow-up message in a second time slot of the ordered set of time slots, as described below.

Additionally, or alternatively, communication management platform 102 may generate a recommendation for modifying a set of recipients of the communication framework. For example, communication management platform 102 may recommend a sub-group of possible message recipients associated with a highest likelihood of response, thereby decreasing a total quantity of messages that are to be sent to achieve a threshold quantity of responses. In some implementations, communication management platform 102 may recommend that one or more message recipients be omitted from the mass communication task. For example, communication management platform 102 may determine that the one or more message recipients are associated with less than a threshold likelihood of responding to messaging of the mass communication task and may recommend omitting the one or more message recipients. In this way, communication management platform 102 may reduce an amount of messaging that is transmitted without reducing a likelihood of successfully achieving a threshold quantity of responses. Additionally, or alternatively, communication management platform 102 may determine to omit a message recipient with a threshold level of job role, thereby avoiding bothering employees at an organization who may already receive excessive messaging.

Additionally, or alternatively, based on the mass communication model, communication management platform 102 may determine a likelihood of a customer-type message recipient unsubscribing from a message list if messaged at a particular time, and may recommend omitting the customer-type message recipient if the likelihood satisfies a threshold, thereby avoiding losing a customer. In contrast, communication management platform 102 may recommend that a particular customer-type message recipient be added to the mass communication task based on a likelihood of successfully responding (e.g., by transmitting a response message, making a purchase, and/or the like). In this case, communication management platform 102 may assign message recipients to a message class, a do-not-message class, and/or the like for the mass communication task, a subsequent mass communication task (e.g., based on ongoing monitoring of the mass communication task), and/or the like, thereby reducing customer attrition, improving customer engagement, and/or the like.

In some implementations, communication management platform 102 may perform a binary classification analysis on messages of the communication framework (e.g., using the mass communication model) to identify a parameter to recommend for alteration. For example, communication management platform 102 may attempt to assign parts of the communication framework to a "threshold rate of response" or a "less than a threshold rate of response" cluster of communication frameworks. In this case, if a part of the communication framework (e.g., a time slot) is assigned to the "less than a threshold rate of response" cluster, communication management platform 102 may generate a recommendation to alter the part of the communication framework.

As further shown in FIG. 1C, and by reference number 164, communication management platform 102 may complete the mass communication task in accordance with the modified communication framework. For example, communication management platform 102 may transmit messages to different users at different times, using different communication channels, and/or the like in accordance with end-user level customizations determined for the modified communication framework. As an example, communication management platform 102 may message an end-user via a communication channel at a pre-selected time to determine whether a training is completed, may detect a response that includes a key phrase triggering the training to occur, and may transmit a pre-configured response from a script based on detecting the key phrase to provide the training via the communication channel. In this case, communication management platform 102 may visualize results of the mass communication task via a dashboard (e.g., a user interface provided to a client device 104 or 106 for display) that identifies key performance indicators (KPIs), such as a response rate, a completion rate, a quantity of follow-up messages transmitted to achieve responses, subsequent recommendations, and/or the like.

In some implementations, communication management platform 102 may start performance of the mass communication task based on detecting a triggering event. For example, communication management platform 102 may detect a user interaction with a user interface of a client device 104, which may trigger communication management platform 102 to perform the mass communication task. Additionally, or alternatively, communication management platform 102 may determine to start the mass communication task at a pre-selected time, based on detecting a satisfaction of a criterion (e.g., detecting that a user is online on a chat interface), and/or the like.

In some implementations, communication management platform 102 may communicate with a set of client devices 104 to complete the mass communication task. For example, communication management platform 102 may transmit a set of messages to a set of client devices 104 associated with a set of message recipients, monitor for a set of responses to the set of messages, and receive the set of responses. In some implementations, communication management platform 102 may automatically transmit follow-up messages. For example, communication management platform 102 may determine that a threshold period of time is elapsed without a response from a particular message recipient, and may automatically transmit a follow-up message, thereby obviating a need to alert a user to manually transmit a follow-up message. In this way, communication management platform 102 may reduce a utilization of computing resources relative to transmitting an alert to a message sender to remind the message sender to send a follow-up message to a message recipient. Furthermore, by automating follow-up messaging, communication management platform 102 may improve response rates to mass communication tasks.

In some implementations, communication management platform 102 may generate a recommendation and modify the communication framework concurrently with performing the mass communication task. For example, communication management platform 102 may add data regarding performance of the mass communication task to the data set for the set of mass communication tasks, update the mass communication model, and use an updated mass communication model to determine modifications to the communication framework. In this case, communication management platform 102 may determine to, for example, change a time slot, a communication channel, and/or the like based on real-time data analysis of the mass communication task.

In some implementations, communication management platform 102 may perform analytics on data relating to responses to the mass communication task. For example, communication management platform 102 may receive a set of responses to messages and may determine a set of engagement scores for the set of message recipients. In this case, an engagement score may represent a level of engagement of a message recipient with the mass communication task specifically, with a job generally, and/or the like. In some implementations, communication management platform 102 may determine an engagement score based on a rate of response to messaging (e.g., a rapidity of responses), a level of engagement with the mass communication task determined based on a content (e.g., determined using a semantic analysis) of responses, a rate of compliance with directions of the mass communication task, a timeliness of a set of responses to messages of the mass communication task, and/or the like.

In some implementations, communication management platform 102 may generate an engagement recommendation. For example, communication management platform 102 may determine that a message recipient's engagement score is less than a threshold, and may recommend a set of response actions to improve a likelihood of retention (e.g., to reduce a likelihood that the message recipient leaves a job).

In this way, communication management platform 102 automates generation of a communication framework, thereby reducing a utilization of computing resources to generate the communication framework. Moreover, communication management platform 102 automatically analyzes the communication framework and provides recommendations for altering and/or customizing the communication framework, thereby increasing a likelihood of response to messages of a mass communication task. This may result in fewer follow-up messages, thereby reducing a utilization of network resources, processing resources, and/or the like. Moreover, based on automating data collection for the mass communication task, communication management platform 102 enables automatic analysis of results of the mass communication task, which may enable reduced employee attrition, customer attrition, and/or the like.

As indicated above, FIGS. 1A-1C are provided merely as one or more examples. Other examples may differ from what is described with regard to FIGS. 1A-1C.

Figure 2A:
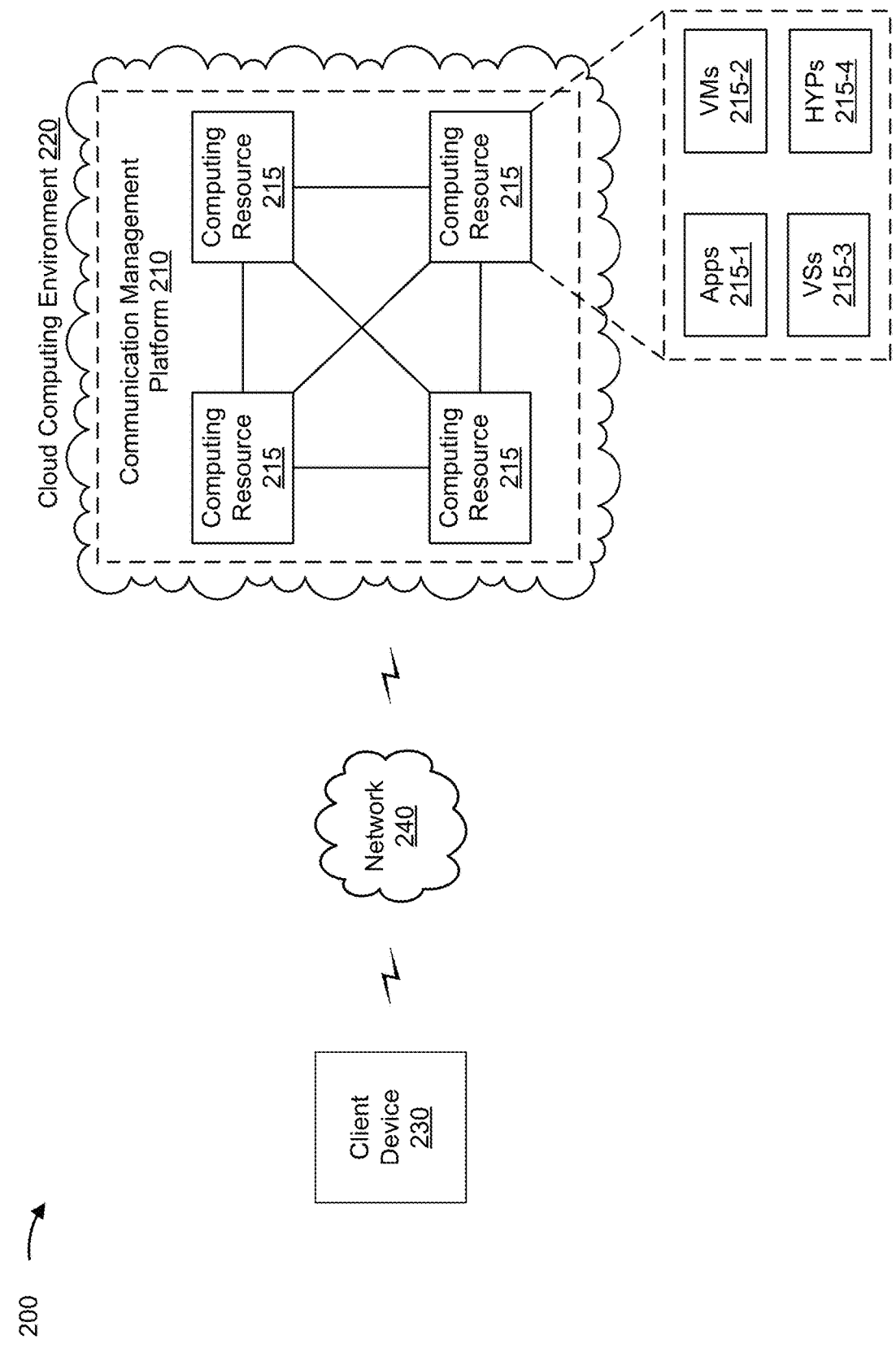

FIGS. 2A and 2B are diagrams of an example environment 200 in which systems and/or methods described herein may be implemented. As shown in FIG. 2A, environment 200 may include a communication management platform 210, a computing resource 215, a cloud computing environment 220, a client device 230, and a network 240. Devices of environment 200 may interconnect via wired connections, wireless connections, or a combination of wired and wireless connections.

Communication management platform 210 includes one or more computing resources assigned to process communications for a mass communication task. For example, communication management platform 210 may be a platform implemented by cloud computing environment 220 that may process thousands, millions, or billions of messages of a mass communication task. In some implementations, communication management platform 210 is implemented by computing resources 215 of cloud computing environment 220.

Communication management platform 210 may include a server device or a group of server devices. In some implementations, communication management platform 210 may be hosted in cloud computing environment 220. Notably, while implementations described herein may describe communication management platform 210 as being hosted in cloud computing environment 220, in some implementations, communication management platform 210 may be non-cloud-based or may be partially cloud-based.

Cloud computing environment 220 includes an environment that delivers computing as a service, whereby shared resources, services, and/or the like may be provided to process communications for a mass communication task. Cloud computing environment 220 may provide computation, software, data access, storage, and/or other services that do not require end-user knowledge of a physical location and configuration of a system and/or a device that delivers the services. As shown, cloud computing environment 220 may include communication management platform 210 and computing resource 215.

Computing resource 215 includes one or more personal computers, workstation computers, server devices, or another type of computation and/or communication device. In some implementations, computing resource 215 may host communication management platform 210. The cloud resources may include compute instances executing in computing resource 215, storage devices provided in computing resource 215, data transfer devices provided by computing resource 215, and/or the like. In some implementations, computing resource 215 may communicate with other computing resources 215 via wired connections, wireless connections, or a combination of wired and wireless connections.

As further shown in FIG. 2A, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by client device 230. Application 215-1 may eliminate a need to install and execute the software applications on client device 230. For example, application 215-1 may include software associated with communication management platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program and may support a single process. In some implementations, virtual machine 215-2 may execute on behalf of a user (e.g., client device 230), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems and may manage the execution of the guest operating systems. Multiple instances of a variety of operating systems may share virtualized hardware resources.

Client device 230 includes one or more devices capable of receiving, generating, storing, processing, and/or providing information associated with process communications for a mass communication task. For example, client device 230 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

As shown in FIG. 2B, communication management platform 210 may include modular functionalities. For example, communication management platform 210 may include a set of modules 280, which may be implemented by computing resources 215 (e.g., as Apps 215-1). Modules 280 may include a message structure/content AI module 280-1 that analyzes a message structure and/or content using artificial intelligence (AI) techniques to determine information regarding a message in a message channel. Modules 280 may include a dynamic automated message/content construction module 280-2 that dynamically generates message content using machine learning techniques to enable messaging with a user. Modules 280 may include a response analytics module 280-3 that performs analysis on metrics regarding messaging, such as metrics regarding message structure, message content, message semantics, and/or the like, and/or message recipients associated therewith.

Modules 280 may include a machine learning module 280-4 that uses machine learning techniques to perform one or more operations described herein, such as clustering, segmentation, pattern matching, prediction, anomaly detection, and/or the like. Modules 280 may include a message scheduling/channel selection optimization module 280-5 that is associated with selecting a time to transmit messages, a messaging channel for messages, and/or the like. Modules 280 may include a recipient targeting automation module 280-6 that identifies recipients for messaging.

Modules 280 may include an automated message dispatch module 280-7 that automatically transmits messages at selected times using selected message channels. Modules 280 may include an automated response collection module 280-8 that collect responses to messages, performs follow-up to obtain responses to messages, and/or the like. Modules 280 may include a response matching/conversation completion detection module 280-9 that matches responses to messages, determines whether a conversation (e.g., a chat that includes request for information and a response) is to be marked complete, and/or the like.

The number and arrangement of devices, networks, and modules shown in FIGS. 2A and 2B are provided as one or more examples. In practice, there may be additional devices, networks, and/or modules, fewer devices, networks, and/or modules, different devices, networks, or differently arranged devices, networks, and/or modules than those shown in FIGS. 2A and 2B. Furthermore, two or more devices or modules shown in FIGS. 2A and 2B may be implemented within a single device or module, or a single device or module shown in FIGS. 2A and 2B may be implemented as multiple, distributed devices or modules. Additionally, or alternatively, a set of devices or modules (e.g., one or more devices or modules) of environment 200 may perform one or more functions described as being performed by another set of devices or modules of environment 200.

Figure 3:
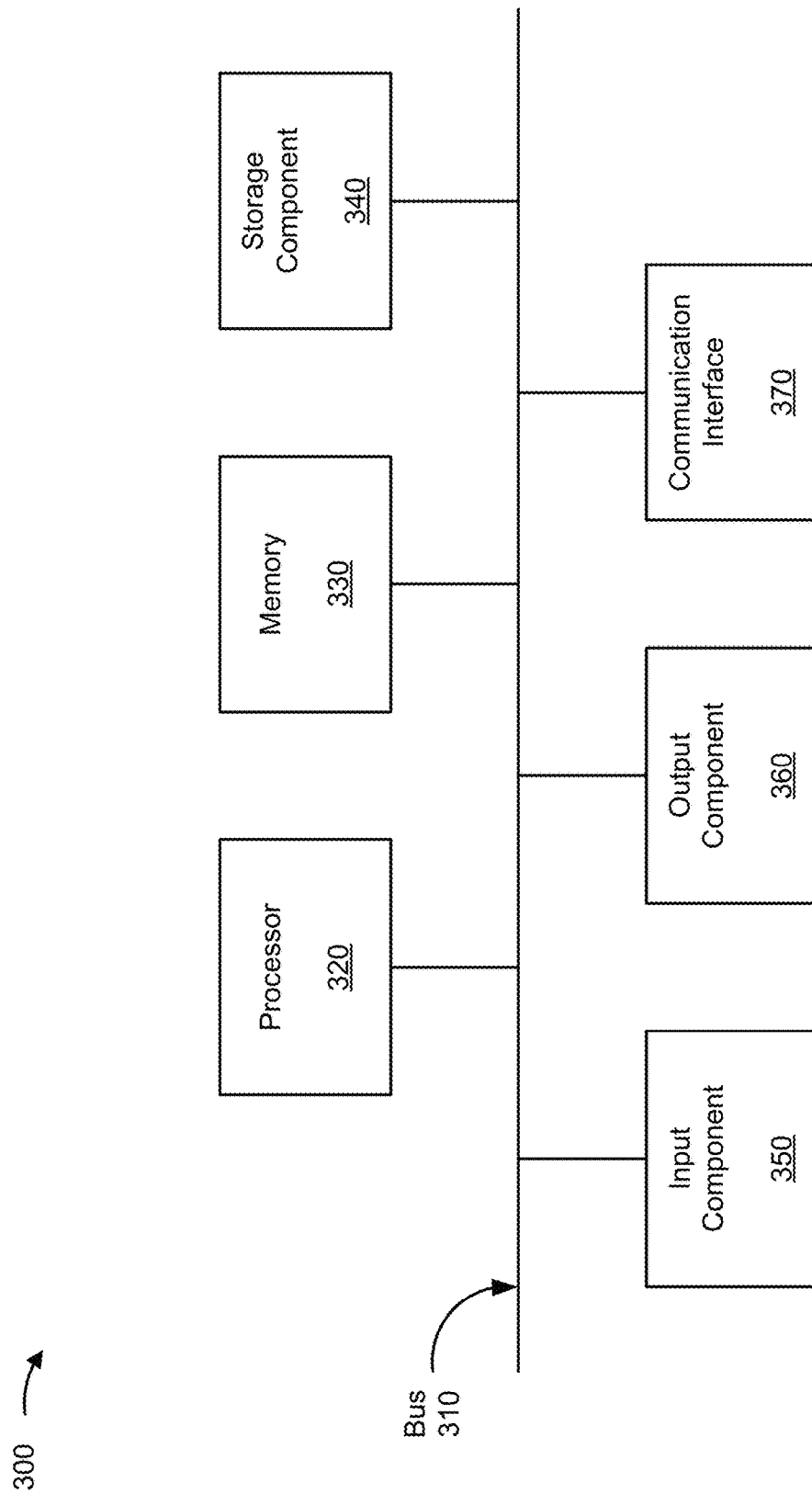
FIG. 3 is a diagram of example components of one or more devices of FIG. 2.

FIG. 3 is a diagram of example components of a device 300. Device 300 may correspond to communication management platform 210, computing resource 215, and/or client device 230. In some implementations, communication management platform 210, computing resource 215, and/or client device 230 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
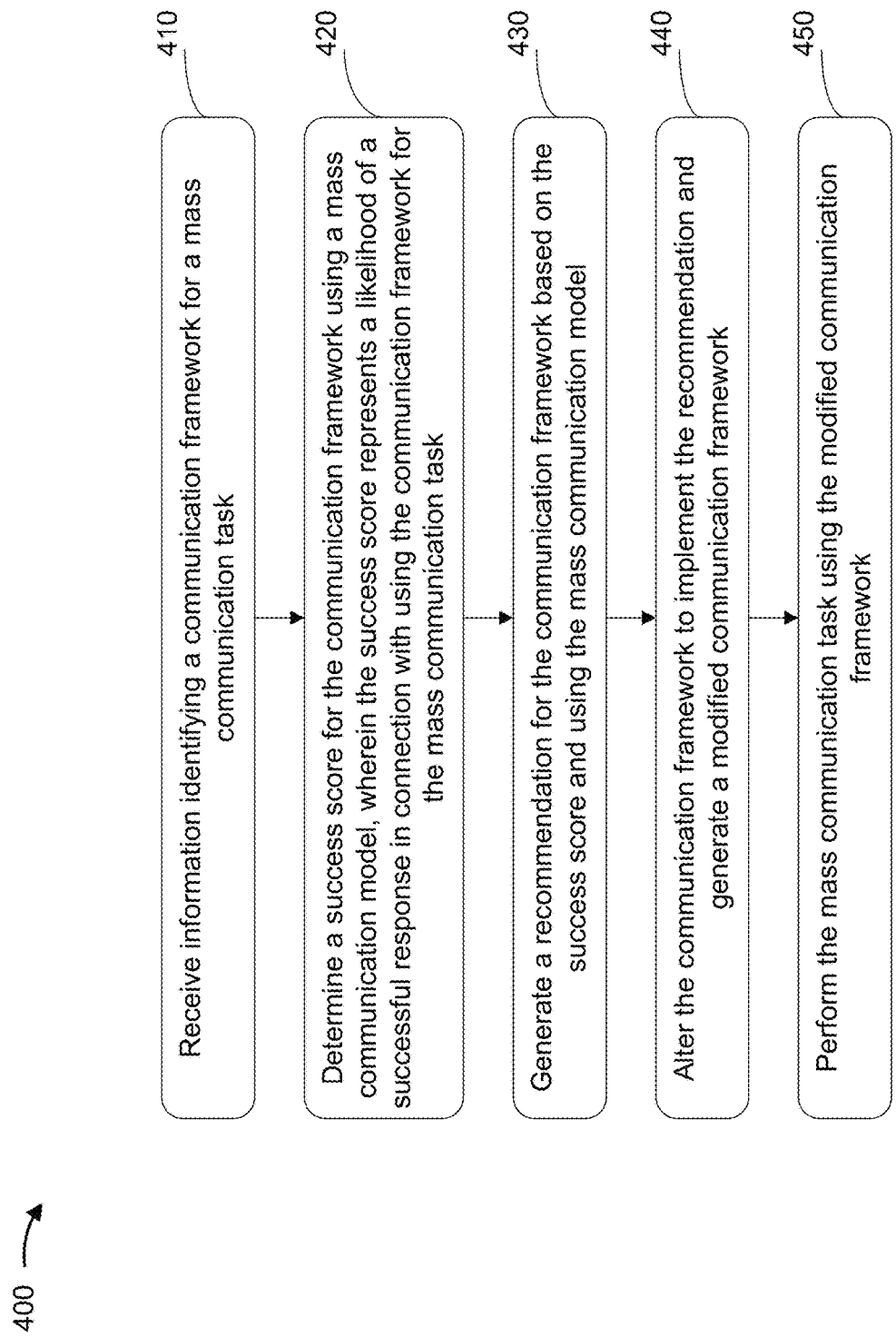
FIGS. 4-6 are flow charts of an example process for mass communication task completion using automated natural language communication analysis.

FIG. 4 is a flow chart of an example process 400 for automated natural language communication analysis. In some implementations, one or more process blocks of FIG. 4 may be performed by a communication management platform (e.g., communication management platform 210). In some implementations, one or more process blocks of FIG. 4 may be performed by another device or a group of devices separate from or including the communication management platform, such as a computing resource (e.g., computing resource 215), a client device (e.g., client device 230), and/or the like.

As shown in FIG. 4, process 400 may include receiving information identifying a communication framework for a mass communication task (block 410). For example, the communication management platform (e.g., using processor 320, memory 330, storage component 340, input component 350, output component 360, communication interface 370 and/or the like) may receive information identifying a communication framework for a mass communication task, as described above.

As further shown in FIG. 4, process 400 may include determining a success score for the communication framework using a mass communication model wherein the success score represents a likelihood of a successful response in connection with using the communication framework for the mass communication task (block 420). For example, the communication management platform (e.g., using processor 320, memory 330, storage component 340, input component 350, output component 360, communication interface 370 and/or the like) may determine a success score for the communication framework using a mass communication model and wherein the success score represents a likelihood of a successful response in connection with using the communication framework for the mass communication task, as described above. In some aspects, the success score represents a likelihood of a successful response in connection with using the communication framework for the mass communication task.

As further shown in FIG. 4, process 400 may include generating a recommendation for the communication framework based on the success score and using the mass communication model (block 430). For example, the communication management platform (e.g., using processor 320, memory 330, storage component 340, input component 350, output component 360, communication interface 370 and/or the like) may generate a recommendation for the communication framework based on the success score and using the mass communication model, as described above.

As further shown in FIG. 4, process 400 may include altering the communication framework to implement the recommendation and generate a modified communication framework (block 440). For example, the communication management platform (e.g., using processor 320, memory 330, storage component 340, input component 350, output component 360, communication interface 370 and/or the like) may alter the communication framework to implement the recommendation and generate a modified communication framework, as described above.

As further shown in FIG. 4, process 400 may include performing the mass communication task using the modified communication framework (block 450). For example, the communication management platform (e.g., using processor 320, memory 330, storage component 340, input component 350, output component 360, communication interface 370 and/or the like) may perform the mass communication task using the modified communication framework, as described above.

Process 400 may include additional implementations, such as any single implementation or any combination of implementations described below and/or in connection with one or more other processes described elsewhere herein.

In a first implementation, process 400 may include receiving a mass communication data set identifying results of a set of mass communication tasks performed using a set of communication frameworks, generating, using a machine learning technique and based on the mass communication data set, the mass communication model, and storing, before receiving the information identifying the communication framework for the mass communication task, the mass communication model for subsequent use in evaluating the communication framework for the mass communication task.

In a second implementation, alone or in combination with the first implementation, the recommendation relates to at least one of a length of an initial message of the communication framework, a relevance of the initial message of the communication framework, a complexity of the communication framework, a clarity of the communication framework, a scheduling of messaging in accordance with the communication framework, or a set of recipients of messages of the communication framework.

In a third implementation, alone or in combination with one or more of the first and second implementations, the success score corresponds to a likelihood of achieving a threshold response rate to one or more messages of the communication framework.

In a fourth implementation, alone or in combination with one or more of the first through third implementations, the mass communication model is trained using at least one of a random forest classifier technique, a multilayer perceptron technique, a stochastic gradient descent technique, or a neural network technique.

In a fifth implementation, alone or in combination with one or more of the first through fourth implementations, altering the communication framework includes selecting, using the mass communication model and based on end-user data, a first timing for messaging associated with a first message recipient; and selecting, using the mass communication model and based on the end-user data, a second timing that is different from the first timing for messaging associated with a second message recipient.

In a sixth implementation, alone or in combination with one or more of the first through fifth implementations, the end-user data includes data identifying at least one of a message recipient location, a message recipient job role, a message recipient job level, or a message recipient response history.

In a seventh implementation, alone or in combination with one or more of the first through sixth implementations, selecting the first timing includes determining a first set of time slot scores for the first message recipient, determining a second set of time slot scores for the second message recipient, and optimizing an assignment of message recipients to time slots based on at least one of the first set of time slot scores, the second set of time slot scores, or a time slot availability criterion.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
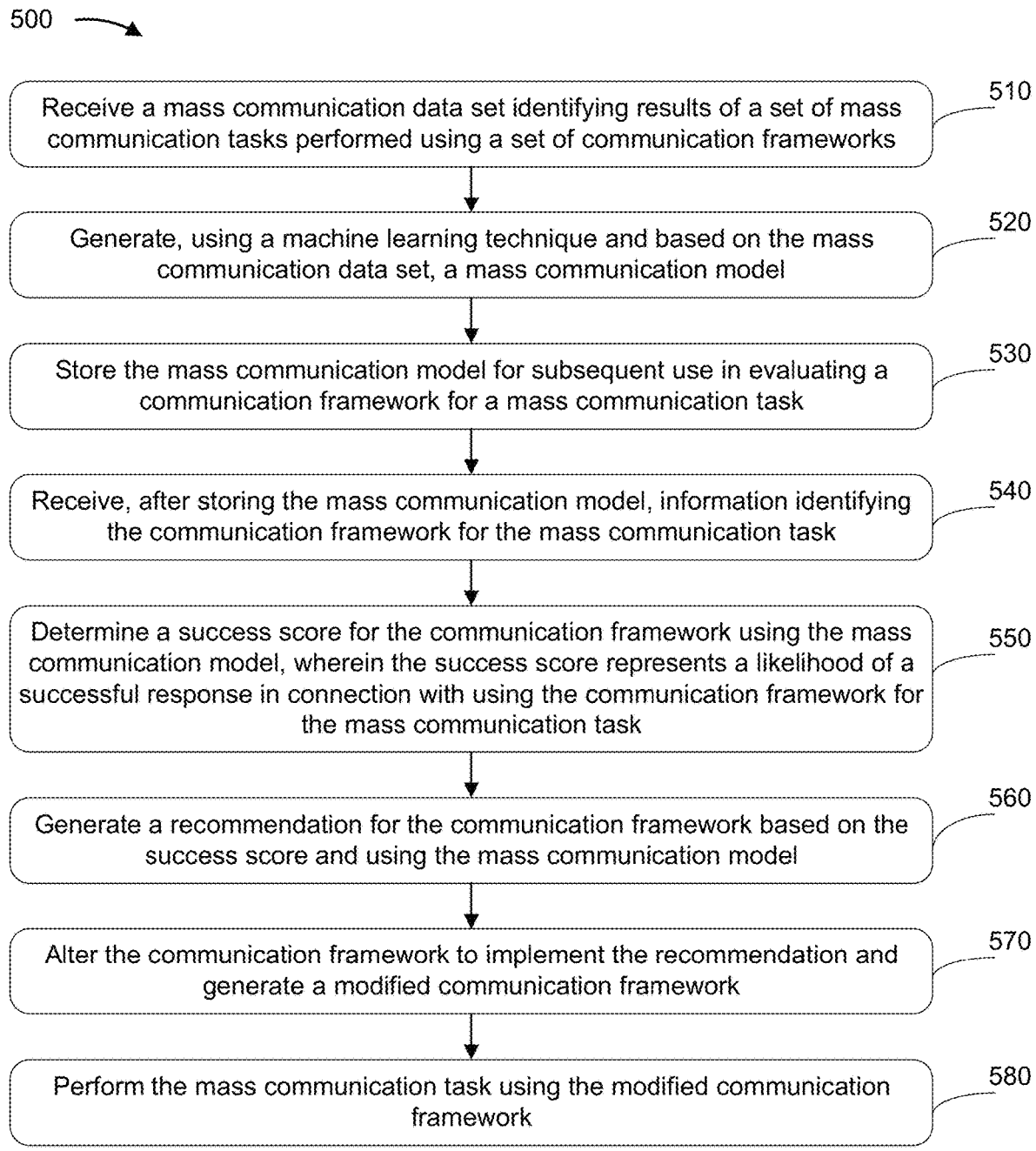

FIG. 5 is a flow chart of an example process 500 for automated natural language communication analysis. In some implementations, one or more process blocks of FIG. 5 may be performed by a communication management platform (e.g., communication management platform 210). In some implementations, one or more process blocks of FIG. 5 may be performed by another device or a group of devices separate from or including the communication management platform, such as a computing resource (e.g., computing resource 215), a client device (e.g., client device 230), and/or the like.

As shown in FIG. 5, process 500 may include receiving a mass communication data set identifying results of a set of mass communication tasks performed using a set of communication frameworks (block 510). For example, the communication management platform (e.g., using processor 320, memory 330, storage component 340, input component 350, output component 360, communication interface 370 and/or the like) may receive a mass communication data set identifying results of a set of mass communication tasks performed using a set of communication frameworks, as described above.

As further shown in FIG. 5, process 500 may include generating, using a machine learning technique and based on the mass communication data set, a mass communication model (block 520). For example, the communication management platform (e.g., using processor 320, memory 330, storage component 340, input component 350, output component 360, communication interface 370 and/or the like) may generate, using a machine learning technique and based on the mass communication data set, a mass communication model, as described above.

As further shown in FIG. 5, process 500 may include storing the mass communication model for subsequent use in evaluating a communication framework for a mass communication task (block 530). For example, the communication management platform (e.g., using processor 320, memory 330, storage component 340, input component 350, output component 360, communication interface 370 and/or the like) may store the mass communication model for subsequent use in evaluating a communication framework for a mass communication task, as described above.

As further shown in FIG. 5, process 500 may include receiving, after storing the mass communication model, information identifying the communication framework for the mass communication task (block 540). For example, the communication management platform (e.g., using processor 320, memory 330, storage component 340, input component 350, output component 360, communication interface 370 and/or the like) may receive, after storing the mass communication model, information identifying the communication framework for the mass communication task, as described above.

As further shown in FIG. 5, process 500 may include determining a success score for the communication framework using the mass communication model wherein the success score represents a likelihood of a successful response in connection with using the communication framework for the mass communication task (block 550). For example, the communication management platform (e.g., using processor 320, memory 330, storage component 340, input component 350, output component 360, communication interface 370 and/or the like) may determine a success score for the communication framework using the mass communication model and wherein the success score represents a likelihood of a successful response in connection with using the communication framework for the mass communication task, as described above. In some aspects, the success score represents a likelihood of a successful response in connection with using the communication framework for the mass communication task.

As further shown in FIG. 5, process 500 may include generating a recommendation for the communication framework based on the success score and using the mass communication model (block 560). For example, the communication management platform (e.g., using processor 320, memory 330, storage component 340, input component 350, output component 360, communication interface 370 and/or the like) may generate a recommendation for the communication framework based on the success score and using the mass communication model, as described above.

As further shown in FIG. 5, process 500 may include altering the communication framework to implement the recommendation and generate a modified communication framework (block 570). For example, the communication management platform (e.g., using processor 320, memory 330, storage component 340, input component 350, output component 360, communication interface 370 and/or the like) may alter the communication framework to implement the recommendation and generate a modified communication framework, as described above.

As further shown in FIG. 5, process 500 may include performing the mass communication task using the modified communication framework (block 580). For example, the communication management platform (e.g., using processor 320, memory 330, storage component 340, input component 350, output component 360, communication interface 370 and/or the like) may perform the mass communication task using the modified communication framework, as described above.

Process 500 may include additional implementations, such as any single implementation or any combination of implementations described below and/or in connection with one or more other processes described elsewhere herein.

In a first implementation, process 500 may include selecting, using the mass communication model and based on end-user data, a first messaging channel for messaging associated with a first message recipient, and selecting, using the mass communication model and based on the end-user data, a second messaging channel, that is different from the first messaging channel, for messaging associated with a second message recipient.

In a second implementation, alone or in combination with the first implementation, the end-user data includes data identifying at least one of a message recipient location, a message recipient job role, a message recipient job level, or a message recipient response history.

In a third implementation, alone or in combination with one or more of the first and second implementations, process 500 may include determining a first set of messaging channel scores for the first message recipient, where a messaging channel score, of the first set of messaging channel scores, represents a likelihood of response in a messaging channel of a set of messaging channels for messaging; determining a second set of messaging channel scores for the second message recipient; and optimizing an assignment of message recipients to messaging channels based on at least one of the first set of messaging channel scores, the second set of messaging channel scores, or a messaging channel availability criterion.

In a fourth implementation, alone or in combination with one or more of the first through third implementations, performing the mass communication task includes transmitting a set of messages to a set of message recipients; monitoring for a set of responses to the set of messages; and selectively providing follow-up messages to one or more message recipients of the set of message recipients, based on a result of monitoring for the set of responses to the set of messages.

In a fifth implementation, alone or in combination with one or more of the first through fourth implementations, process 500 includes determining, based on the mass communication model, at least one message recipient, of a set of message recipients to whom a message is to be sent, to omit from the mass communication task.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
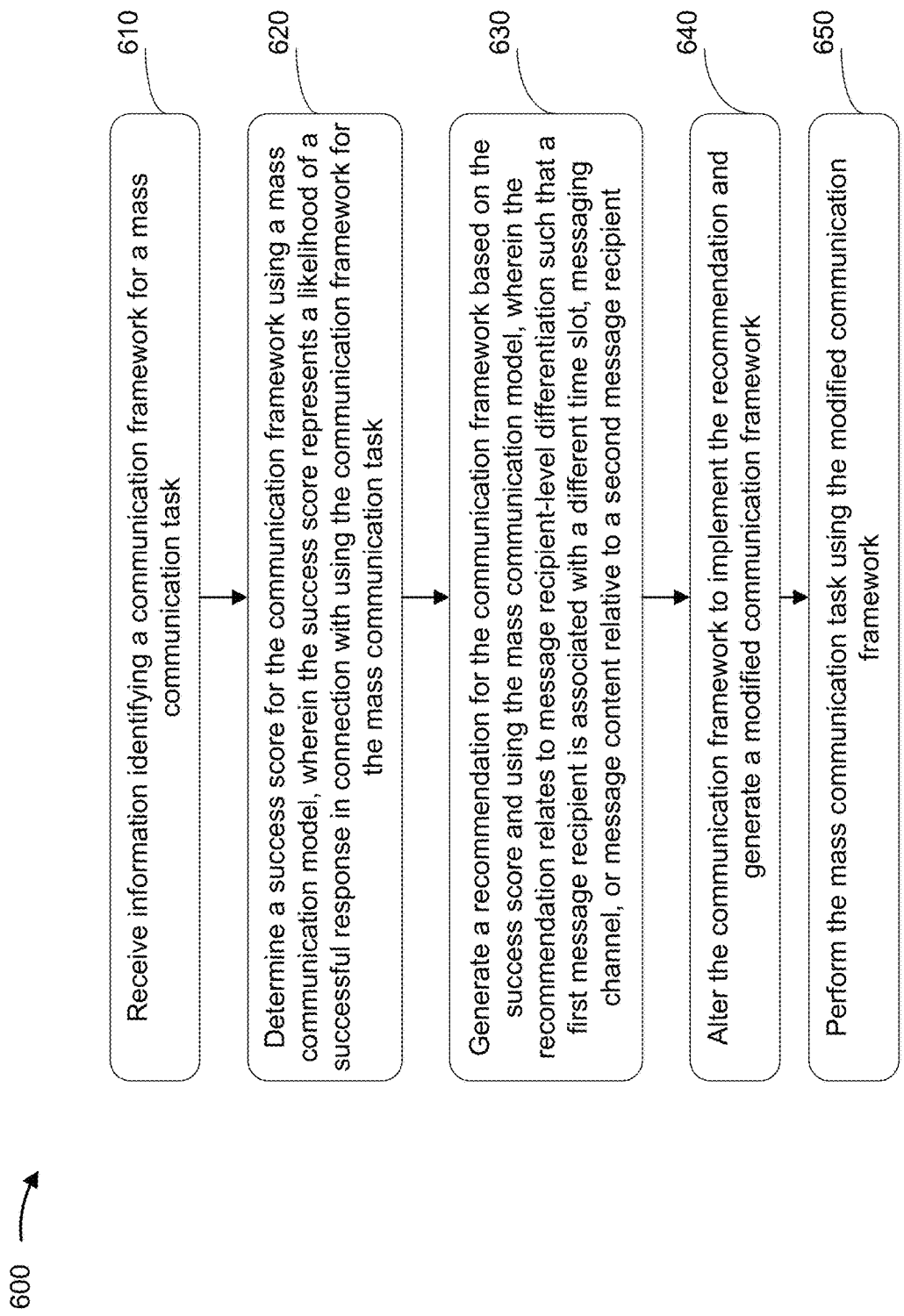

FIG. 6 is a flow chart of an example process 600 for automated natural language communication analysis. In some implementations, one or more process blocks of FIG. 6 may be performed by communication management platform (e.g., communication management platform 210). In some implementations, one or more process blocks of FIG. 6 may be performed by another device or a group of devices separate from or including the communication management platform, such as a computing resource (e.g., computing resource 215), a client device (e.g., client device 230), and/or the like.

As shown in FIG. 6, process 600 may include receiving information identifying a communication framework for a mass communication task (block 610). For example, the communication management platform (e.g., using processor 320, memory 330, storage component 340, input component 350, output component 360, communication interface 370 and/or the like) may receive information identifying a communication framework for a mass communication task, as described above.

As further shown in FIG. 6, process 600 may include determining a success score for the communication framework using a mass communication model, wherein the success score represents a likelihood of a successful response in connection with using the communication framework for the mass communication task (block 620). For example, the communication management platform (e.g., using processor 320, memory 330, storage component 340, input component 350, output component 360, communication interface 370 and/or the like) may determine a success score for the communication framework using a mass communication model and wherein the success score represents a likelihood of a successful response in connection with using the communication framework for the mass communication task, as described above. In some aspects, the success score represents a likelihood of a successful response in connection with using the communication framework for the mass communication task.

As further shown in FIG. 6, process 600 may include generating a recommendation for the communication framework based on the success score and using the mass communication model, wherein the recommendation relates to message recipient-level differentiation such that a first message recipient is associated with a different time slot, messaging channel, or message content relative to a second message recipient (block 630). For example, the communication management platform (e.g., using processor 320, memory 330, storage component 340, input component 350, output component 360, communication interface 370 and/or the like) may generate a recommendation for the communication framework based on the success score and using the mass communication model, wherein the recommendation relates to message recipient-level differentiation such that a first message recipient is associated with a different time slot or messaging channel relative to a second message recipient, as described above. In some aspects, the recommendation relates to message recipient-level differentiation such that a first message recipient is associated with a different time slot, messaging channel, or message content relative to a second message recipient.

As further shown in FIG. 6, process 600 may include altering the communication framework to implement the recommendation and generate a modified communication framework (block 640). For example, the communication management platform (e.g., using processor 320, memory 330, storage component 340, input component 350, output component 360, communication interface 370 and/or the like) may alter the communication framework to implement the recommendation and generate a modified communication framework, as described above.

As further shown in FIG. 6, process 600 may include performing the mass communication task using the modified communication framework (block 650). For example, the communication management platform (e.g., using processor 320, memory 330, storage component 340, input component 350, output component 360, communication interface 370 and/or the like) may perform the mass communication task using the modified communication framework, as described above.

Process 600 may include additional implementations, such as any single implementation or any combination of implementations described below and/or in connection with one or more other processes described elsewhere herein.

In a first implementation, process 600 includes determining, based on the mass communication model, at least one message recipient, of a set of message recipients to whom a message is to be sent, to omit from the mass communication task.

In a second implementation, alone or in combination with the first implementation, process 600 includes determining a set of message recipient responses to the mass communication task; determining, based on the set of message recipient responses, a set of engagement scores for a set of message recipients associated with the mass communication task; generating an engagement recommendation for message recipient retention based on the set of engagement scores; and automatically performing a response action to implement the engagement recommendation.

In a third implementation, alone or in combination with one or more of the first and second implementations, the set of engagement scores is determined based on at least one of a rate of response to messaging of the mass communication task, an engagement with the mass communication task, a rate of compliance with directions of the mass communication task, a content of the set of message recipient responses, or a timeliness of the set of message recipient responses.

In a fourth implementation, alone or in combination with one or more of the first through third implementations, an engagement score, of the set of engagement scores, corresponds to a predicted rate of attrition for a message recipient of the set of message recipients.

In a fifth implementation, alone or in combination with one or more of the first through fourth implementations, receiving the information identifying the communication framework includes receiving information identifying a first part of the communication framework; generating, based on the mass communication model and the first part of the communication framework, a communication framework recommendation for a second part of the communication framework; and automatically completing the communication framework based on the communication framework recommendation.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, information identifying a communication framework for a mass communication task;
   determining, by the device, a success score for the communication framework using a mass communication model,
      wherein the success score represents a likelihood of a successful response in connection with using the communication framework for the mass communication task;
   generating, by the device, a recommendation for the communication framework based on the success score and using the mass communication model;
   altering, by the device, the communication framework to implement the recommendation and generate a modified communication framework,
      wherein altering the communication framework comprises:
         optimizing an assignment of message recipients to time slots based on determining a ratio of responses received to messages sent in other mass communication tasks that includes a particular message recipient,
         selecting, using the mass communication model and based on end-user data, a first timing for messaging associated with a first message recipient,
            wherein selecting the first timing comprises:
               determining a first set of time slot scores for the first message recipient,
                  wherein a time slot score, of the first set of time slot scores, represents a likelihood of response in a time slot of a set of time slots for messaging,
               determining a second set of time slot scores for the second message recipient, and
               optimizing an assignment of message recipients to time slots based on at least one of the first set of time slot scores, the second set of time slot scores, or a time slot availability criterion, and
         selecting, using the mass communication model and based on the end-user data, a second timing that is different from the first timing for messaging associated with a second message recipient; and
   performing, by the device, the mass communication task using the modified communication framework.

2. The method of claim 1, further comprising:
   receiving a mass communication data set identifying results of a set of mass communication tasks performed using a set of communication frameworks;
   generating, using a machine learning technique and based on the mass communication data set, the mass communication model; and
   storing, before receiving the information identifying the communication framework for the mass communication task, the mass communication model for subsequent use in evaluating the communication framework for the mass communication task.

3. The method of claim 1, wherein the recommendation relates to at least one of:
   a length of an initial message of the communication framework,
   a relevance of the initial message of the communication framework,
   a complexity of the communication framework,
   a clarity of the communication framework,
   a scheduling of messaging in accordance with the communication framework, or
   a set of recipients of messages of the communication framework.

4. The method of claim 1, wherein the success score corresponds to a likelihood of achieving a threshold response rate to one or more messages of the communication framework.

5. The method of claim 1, wherein the mass communication model is trained using at least one of:
   a random forest classifier technique,
   a multilayer perceptron technique,
   a stochastic gradient descent technique, or
   a neural network technique.

6. The method of claim 1, wherein the end-user data includes data identifying at least one of:
  a message recipient location,
  a message recipient job role,
  a message recipient job level, or
  a message recipient response history.

7. A device, comprising:
  one or more memories; and
  one or more processors communicatively coupled to the one or more memories, configured to:
    receive a mass communication data set identifying results of a set of mass communication tasks performed using a set of communication frameworks;
    generate, using a machine learning technique and based on the mass communication data set, a mass communication model;
    store the mass communication model for subsequent use in evaluating a communication framework for a mass communication task;
    receive, after storing the mass communication model, information identifying the communication framework for the mass communication task;
    determine a success score for the communication framework using the mass communication model,
      wherein the success score represents a likelihood of a successful response in connection with using the communication framework for the mass communication task;
    generate a recommendation for the communication framework based on the success score and using the mass communication model;
    alter the communication framework to implement the recommendation and generate a modified communication framework,
      wherein, the one or more processors, when altering the communication framework, are to:
        determine a ratio of responses received to messages sent in other mass communication tasks that includes a particular message recipient,
        select, using the mass communication model and based on end-user data, a first timing for messaging associated with a first message recipient,
          wherein the one or more processors, to select the first timing, are configured to:
            determine a first set of time slot scores for the first message recipient,
              wherein a time slot score, of the first set of time slot scores, represents a likelihood of response in a time slot of a set of time slots for messaging,
            determine a second set of time slot scores for the second message recipient, and
            optimize an assignment of message recipients to time slots based on at least one of the first set of time slot scores, the second set of time slot scores, or a time slot availability criterion, and
        select, using the mass communication model and based on the end-user data, a second timing that is different from the first timing for messaging associated with a second message recipient; and
    perform the mass communication task using the modified communication framework.

8. The device of claim 7, wherein the one or more processors are configured to:
  select, using the mass communication model and based on the end-user data, a first messaging channel for messaging associated with a third message recipient; and
  select, using the mass communication model and based on the end-user data, a second messaging channel, that is different from the first messaging channel, for messaging associated with a fourth message recipient.

9. The device of claim 8, wherein the end-user data includes data identifying at least one of:
  a message recipient location,
  a message recipient job role,
  a message recipient job level, or
  a message recipient response history.

10. The device of claim 8, wherein the one or more processors, when selecting the first messaging channel, are configured to:
  determine a first set of messaging channel scores for the first message recipient,
    wherein a messaging channel score, of the first set of messaging channel scores, represents a likelihood of response in a messaging channel of a set of messaging channels for messaging;
  determine a second set of messaging channel scores for the second message recipient; and
  optimize an assignment of message recipients to messaging channels based on at least one of the first set of messaging channel scores, the second set of messaging channel scores, or a messaging channel availability criterion.

11. The device of claim 7, wherein the one or more processors, when performing the mass communication task, are configured to:
  transmit a set of messages to a set of message recipients;
  monitor for a set of responses to the set of messages; and
  selectively provide follow-up messages to one or more message recipients of the set of message recipients, based on a result of monitoring for the set of responses to the set of messages.

12. The device of claim 7, wherein the one or more processors, when altering the communication framework, are configured to:
  determine, based on the mass communication model, at least one message recipient, of a set of message recipients to whom a message is to be sent, to omit from the mass communication task.

13. A non-transitory computer-readable medium storing instructions, the instructions comprising:
  one or more instructions that, when executed by one or more processors, cause the one or more processors to:
    receive information identifying a communication framework for a mass communication task;
    determine a success score for the communication framework using a mass communication model,
      wherein the success score represents a likelihood of a successful response in connection with using the communication framework for the mass communication task;
    generate a recommendation for the communication framework based on the success score and using the mass communication model,
      wherein the recommendation relates to message recipient-level differentiation such that a first message recipient is associated with a different time slot, messaging channel, or message content relative to a second message recipient;

alter the communication framework to implement the recommendation and generate a modified communication framework,
wherein the one or more instructions, that cause the one or more processors to alter the communication framework, cause the one or more instructions to:
optimize an assignment of message recipients to time slots based on determining a ratio of responses received to messages sent in other mass communication tasks that includes a particular message recipient,
select, using the mass communication model and based on end-user data, a first timing for messaging associated with the first message recipient,
wherein the one or more instructions, that cause the one or more processors to select the first timing, cause the one or more processors to:
determine a first set of time slot scores for the first message recipient,
wherein a time slot score, of the first set of time slot scores, represents a likelihood of response in a time slot of a set of time slots for messaging,
determine a second set of time slot scores for the second message recipient, and
optimize an assignment of message recipients to time slots based on at least one of the first set of time slot scores, the second set of time slot scores, or a time slot availability criterion, and
select, using the mass communication model and based on the end-user data, a second timing that is different from the first timing for messaging associated with the second message recipient; and
perform the mass communication task using the modified communication framework.

14. The non-transitory computer-readable medium of claim 13, wherein the one or more instructions, that cause the one or more processors to alter the communication framework, cause the one or more processors to:
determine, based on the mass communication model, at least one message recipient, of a set of message recipients to whom a message is to be sent, to omit from the mass communication task.

15. The non-transitory computer-readable medium of claim 13, wherein the one or more instructions, when executed by the one or more processors, further cause the one or more processors to:
determine a set of message recipient responses to the mass communication task;
determine, based on the set of message recipient responses, a set of engagement scores for a set of message recipients associated with the mass communication task;
generate an engagement recommendation for message recipient retention based on the set of engagement scores; and
automatically perform a response action to implement the engagement recommendation.

16. The non-transitory computer-readable medium of claim 15, wherein the set of engagement scores is determined based on at least one of:
a rate of response to messaging of the mass communication task,
an engagement with the mass communication task,
a rate of compliance with directions of the mass communication task,
a content of the set of message recipient responses, or
a timeliness of the set of message recipient responses.

17. The non-transitory computer-readable medium of claim 15, wherein an engagement score, of the set of engagement scores, corresponds to a predicted rate of attrition for a message recipient of the set of message recipients.

18. The non-transitory computer-readable medium of claim 13, wherein the one or more instructions, that cause the one or more processors to receive the information identifying the communication framework, cause the one or more processors to:
receive information identifying a first part of the communication framework;
generate, based on the mass communication model and the first part of the communication framework, a communication framework recommendation for a second part of the communication framework; and
automatically complete the communication framework based on the communication framework recommendation.

19. The method of claim 1, further comprising:
selecting, using the mass communication model and based on the end-user data, a first messaging channel for messaging associated with the first message recipient; and
selecting, using the mass communication model and based on the end-user data, a second messaging channel, that is different from the first messaging channel, for messaging associated with the second message recipient.

20. The method of claim 1, wherein altering the communication framework, comprises:
determining, based on the mass communication model, at least one message recipient, of a set of message recipients to whom a message is to be sent, to omit from the mass communication task.

* * * * *